Patented Apr. 4, 1950

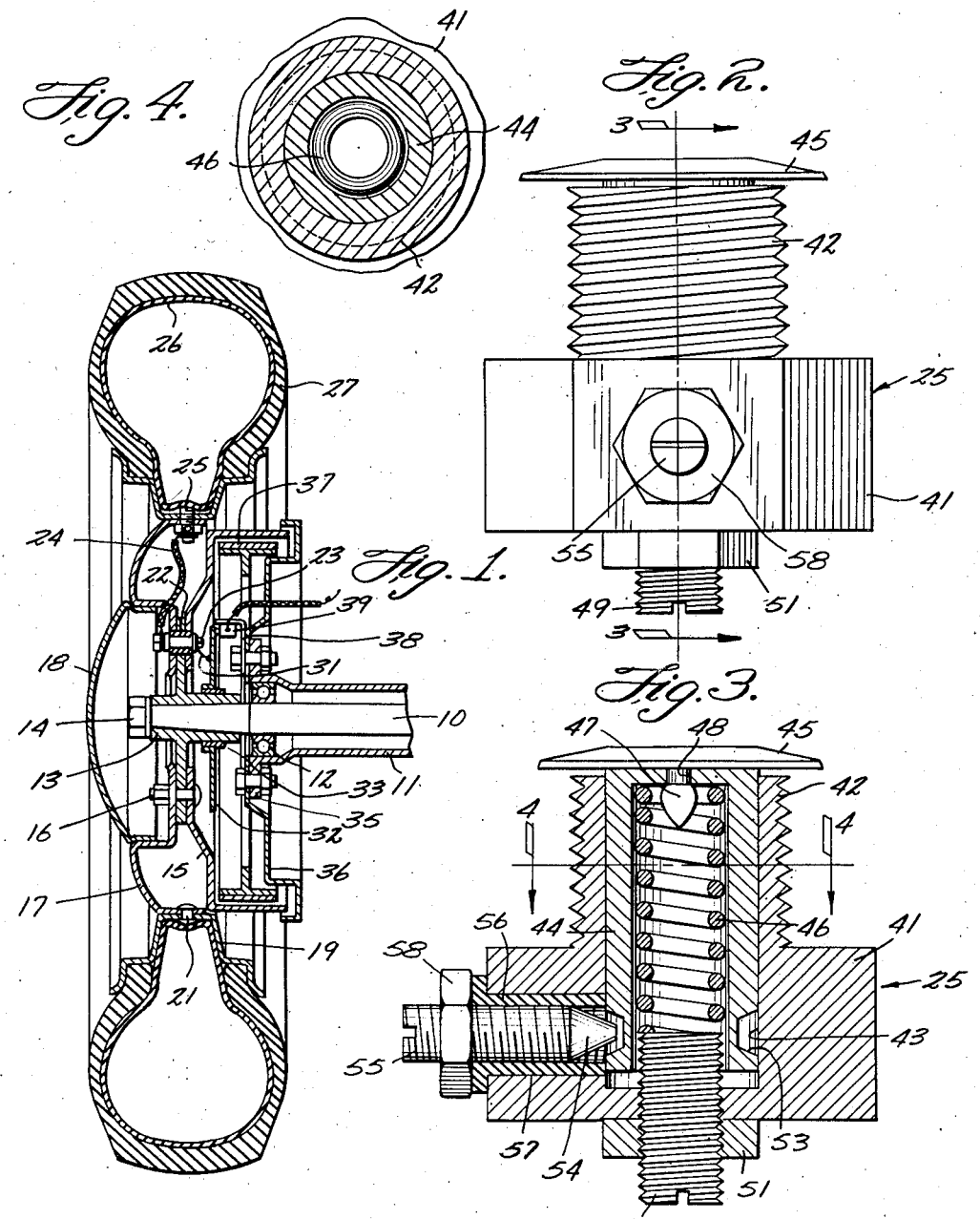

2,502,515

UNITED STATES PATENT OFFICE 2,502,515

TIRE PRESSURE INDICATOR

Warren J. Flanery and Warren H. Flanery, Farmers, Ky.

Application May 7, 1948, Serial No. 25,636

2 Claims. (Cl. 200—58)

This invention relates to tire pressure indicators.

It is an object of the present invention to provide a tire pressure indicator wherein if the air in a tire is lowered by a small amount of pressure and needs to be pumped up a signal will be made in the driver's compartment, in the way of a light which might flash or by a sound indicator and wherein the operator will be adequately warned of the drop in pressure in tires and wherein the indicator can be disposed on the tire rim at the inner side thereof and does not need to extend outwardly from the sides of the tire rim or in engagement with the tire itself but is adapted to be acted upon by the innertube directly.

Other objects of the present invention are to provide a tire indicator adapted to be connected to an electric signal device which is of simple construction, inexpensive to manufacture, easy to install and efficient in operation.

For other objects and for a better understanding of the invention, reference may be had to the following detailed description taken in connection with the accompanying drawing, in which Fig. 1 is a sectional view, in elevation, taken through a vehicle wheel and with the indicator embodying the features of the present invention attached to the wheel rim.

Fig. 2 is an enlarged side elevational view of the indicator removed from the wheel rim.

Fig. 3 is a sectional view of the indicator taken on line 3—3 of Fig. 2.

Fig. 4 is a transverse sectional view taken through the indicator and on line 4—4 of Fig. 3.

Referring now to the figures, 10 represents an axle about which is extended an axle housing 11. The axle shaft is journalled in a ball bearing element 12 carried by the housing 11. On the other end of the shaft is a hub 13 which is secured by a nut 14. On this hub there is connected a brake band 15 by bolts 16. Also connected to the hub by the same bolts is a wheel plate 17 adapted to receive a hub cap 18. The wheel plate has a tire rim 19 secured to the same by rivets 21. To one of the bolts 16 there is provided insulation 22 and a terminal 23. To this terminal there is connected by a wire 24 a tire indicating element 25 adapted to be operated by innertube 26 within tire 27 carried in the rim 19. The terminal 23 has a wire 31 connected to the same adapted to engage a plate 32 which is connected to hub 13 through an insulating sleeve 33.

The housing 11 has a flange 35 thereon to which is connected a cover plate 36 for brake drum 15. The brake shoes are indicated at 37. On the plate 36 is a bracket 38 which carries a contact 39 from which a wire extends. The disk or plate 32 engaging with the contact establishes a circuit which may comprise any type of a signal indicator that can be located in the operator's compartment of a vehicle. The same may be in the form of a light or other indicator.

The indicator 25 comprises a body member 41 having a threaded portion 42. An opening extends through the body member 41 and through the threaded portion as indicated at 43. Within this opening there is adjustable a sleeve 44 having an enlarged plate 45 therein adapted to have the innertube 26 in engagement over a large area for effecting the movement of the sleeve 44. Within the sleeve 44 is a large spring 46 which supports the sleeve 44 in a raised position. The spring is centered on the sleeve by an enlargement 47. The member 45 and the enlargement 47 is of rubber so that it can be removed from the sleeve 44. An opening 48 is provided for receiving the enlargement 47.

An adjusting screw 49 extends through the body 41 and supports the spring 46. The extent to which the screw 49 is extended into the opening 43 will depend upon the tire pressure which is being used. The screw 49 can be retained in its adjusted position by a lock nut 51.

The sleeve 44 has a peripheral groove 53 into which extends a tapered end 54 of a terminal 55 which extends through an insulating sleeve 56 in an opening 57 in the main body portion 41 of the indicator. The terminal 55 is held in place by a lock nut 58 and this same lock nut may be used to secure the wire 24 to the terminal.

The adjustment of the screw 49 is such as to normally keep the sleeve groove 43 in spaced relation from the tapered end 54 of the terminal 55. With the member 45 engaging with the innertube and with the air being of less pressure within the tire, the sleeve 44 will be urged outwardly by the spring 46 and engagement will be made by the wall of the groove 53 with the terminal end 54. The body portion 41 is normally grounded to the vehicle and accordingly when the contact is made a circuit will be established. The terminal 36 being connected to a battery source not shown and to a signal indicator in the usual manner.

The member 45 is preferably of rubber so as to prevent injury to the innertube which would ordinarily occur if the engagement of the innertube was made with the metal sleeve.

While various changes may be made in the detail construction, it shall be understood that such changes shall be within the spirit and scope of the present invention as defined by the appended claims.

We claim:

1. A tire pressure indicator adapted to be secured to a wheel portion and to a rim on the wheel, having a main portion, a threaded sleeve portion extending from the main portion and adapted for the securement of the indicator to the wheel portion and the rim, said main portion and the sleeve portion having a central opening, a sleeve adjustable in the central opening, adjustable spring means for adjusting the sleeve to withstand different tire pressure, the sleeve extending outwardly of the threaded sleeve portion and having means thereon adapted to engage with the inner tube of the tire, terminal means in the body portion adapted to be engaged by the sleeve to establish a circuit above the movement of the sleeve being effected by a change in the pressure in the inner tube, and said terminal means including a terminal member having a reduced end portion, said sleeve having a peripheral groove adapted to contain the reduced end portion but normally out of engagement with the terminal end so long as a predetermined pressure is maintained on the tire.

2. A tire pressure indicator as defined in claim 1, and said means on the sleeve adapted for the engagement with the innertube being formed of soft material and having a projection adapted to be extended into an opening in the sleeve in a removable manner.

WARREN J. FLANERY.
WARREN H. FLANERY.

REFERENCES CITED

The following references are of record in the file of this patent:

UNITED STATES PATENTS

| Number | Name | Date |
|---|---|---|
| 1,369,725 | Bergier | Feb. 22, 1921 |
| 2,179,255 | Edmonston | Nov. 7, 1939 |
| 2,223,423 | Lunde | Dec. 3, 1940 |
| 2,249,426 | Jones et al. | July 15, 1941 |